Patented Oct. 29, 1940

2,219,684

UNITED STATES PATENT OFFICE 2,219,684

LAMINATED PRODUCT

Eric William Fawcett, Walton-upon-Thames, Reginald Oswald Gibson, Northwich, Cheshire, and Michael Willcox Perrin, London, England, assignors to Imperial Chemical Industries Limited, a corporation of Great Britain No Drawing. Application March 2, 1939, Serial No. 259,444. In Great Britain February 4, 1936

4 Claims. (Cl. 49—92)

This invention relates to laminated articles and more particularly to laminated glass.

This application is a continuation-in-part of our copending application Serial Number 123,722, filed February 2, 1937, which describes new ethylene polymers and their use as adhesives in the preparation of safety glass and other laminated articles.

An object of this invention is to provide a new and improved type of laminated glass in which the laminae are united through a film or layer of great strength and durability. A still further object is to provide methods for making laminated glass wherein the interlayer comprises a polymer of the type described in the above-mentioned copending application. Other objects will appear hereinafter.

These objects are accomplished by uniting two or more laminae by means of a layer comprising a synthetic linear polymer which is produced in accordance with the method described in our aforementioned copending application or in U. S. Patent 2,153,553. More particularly the invention comprises laminated glass composed of two sheets of glass having therebetween a film or layer of the ethylene polymer which may be used as the sole bonding agent and as the interlayer.

The solid polymers of ethylene used in the practice of this invention are prepared by a process which consists in subjecting ethylene to a pressure in excess of 500 atmospheres under controlled elevated temperature conditions. This procedure results in polymers of ethylene, the molecular weight of which varies depending particularly upon the pressure employed. By using pressures of more than 1000 atmospheres, solid polymers are formed and under these conditions the polymerization reaction takes place, requiring several hours for completion. These polymers may also be made (in accordance with the process described in the copending application of Paton, Perrin and Williams, Serial Number 157,810) by including in the ethylene a small quantity of oxygen which may be as little as 0.01% but preferably 0.03% to 0.10% at 1500 atmospheres and 190° to 210° C. The pressures are at least 500 atmospheres and preferably at least 1000 atmospheres and below 3000 atmospheres. The temperatures are between 100° C. and 400° C. and more particularly from 150° C. to 250° C. Thus, as a specific instance of obtaining the solid polymers, ethylene containing 0.05% oxygen is compressed in a steel bomb to a total pressure of 1500 atmospheres and heated rapidly to 210° C., whereupon a very sudden change in pressure followed by a slow drop in pressure is observed. After five hours' heating at 210° C. the pressure is released and the product cooled. Under these conditions an 80% yield of the solid polymer, based on the ethylene used, is obtained.

The ethylene polymers obtained as outlined above melt within or above the range of about 100° to about 120° C., have an average molecular weight in excess of 6000, are essentially saturated products corresponding in compositions substantially to $(CH_2)_x$, and when subjected to X-ray diffraction analysis show a crystalline structure. These polymers are soluble in xylene at its boiling point, are unaffected by prolonged contact with air at ordinary temperatures, and are characterized by the fact that they can be formed into films and filaments which yield oriented products on application of stress herein referred to as "cold drawing." The oriented products furnish fiber diffraction patterns on examination with X-rays and exhibit birefringence and parallel extinction when observed under crossed Nicol prisms.

The present invention consists in the application of the above-mentioned solid polymers of ethylene in the preparation of laminated glass. It has been found that solid polymers of ethylene having molecular weights in excess of 10,000 can be made to form a satisfactory bond with glass, and that the laminated articles so formed are substantially unaffected by changes in temperature and humidity which such articles encounter in service. Furthermore, the laminated glass is very good in resistance to the commonly applied break and crush tests, and in this respect is not sensitive to wide variations in temperature. In other words, it is shatter-proof. Depending on the use to which the laminated article is to be put, the interlayer may be transparent, translucent, or opaque.

The polymers mentioned above possess to an unusual degree the properties essential to the production of a successful laminated or safety glass. While the properties of the solid polymers of ethylene will vary somewhat with their molecular weight, common characteristics, substantially independent of molecular weight, are good thermal and light stability, good water resistance, and good aging qualities. As already indicated, films, filaments and the like prepared from the solid polymers of ethylene are further characterized by the fact that they yield oriented products on cold drawing; in general, cold drawing improves the toughness, elasticity, and utility of the articles. The most useful solid polymers of ethylene for the purpose of this invention have melting points within or above the range of 100° C. to about 120° C., and average molecular weights in excess of 6000 and preferably in excess of 10,000.

Since the solid polymers of ethylene can be melted without decomposition, it is possible to form films, sheets, and the like directly from the molten polymers. Films prepared in this manner are generally translucent unless they are cooled by rapid chilling, e. g., by extruding the polymer in sheet form into a suitable quenching liquid such as water. This rapid chilling or "tempering" of the hot films also leads to a tougher product. Films can be prepared by flowing solutions or emulsions of the solid polymers of ethylene on a suitable surface, as, for example, glass, and evaporating the solvent or by regenerating the film or sheet by extrusion into a suitable coagulating bath. Films obtained by these methods are also generally translucent, but they may be made transparent by rapid chilling of the hot films as above stated.

The laminated articles of this invention can be prepared in a number of ways. A convenient method consists in placing a layer or sheet of the solid polymer of ethylene between two plates of glass and then pressing the plates together under the influence of heat and pressure. Although the thickness of the layer may be varied within wide limits depending upon the type of product desired, for most purposes layers of 0.015 to 0.050 inch thickness are most desirable. The temperatures employed for this purpose should preferably be below the melting point of the polymer if transparent laminations are desired. After adhesion has been effected, the article is allowed to cool to room temperature. Still another method consists in flowing a solution of the solid polymer of ethylene on the glass plate, evaporating the solvent or at least the major portion thereof, and then applying the other plate of glass. Instead of using a preformed film or a solution, polymer in the form of a powder may be used. The preferred method of effecting lamination consists in applying a suitable adhesive to both sheets of glass, interposing therebetween a preformed sheet of polymer, and combining the two sheets of glass by means of heat and pressure.

The following examples in which the parts are by weight illustrate the invention more specifically:

*Example I*

Five-inch by five-inch plates of glass were sprayed with adhesive "A," hereinafter described, and allowed to dry for 15 minutes at room temperature. A coating of a toluene solution of an isobutylene polymer having a molecular weight of about 10,000 was sprayed over the treated glass and allowed to dry 4 hours at 45° C. At the end of this time a sheet of an ethylene polymer having a thickness of approximately 0.02 inch and a molecular weight of about 18,000 was interposed between two sheets of glass prepared as described above and the assembly heated to about 105° C. under a pressure of about 4 lbs. per sq. in. in a platen press. The assembly was kept in the press just long enough to melt the plastic. The assembly was then removed from the press and allowed to cool in air. The resultant laminated glass shows shatterproofness not only at 50° C., but also at −18° C.

Adhesive "A" used in the above example was made as follows:

Forty cc. of a 1% solution of concentrated hydrochloric acid in water was mixed with 50 cc. of a 2% solution of sodium silicate, 10 cc. of a 2% sodium carbonate solution, and 2 cc. of diethylene glycol.

*Example II*

A uniform layer of approximately 0.02 inch thickness made from a polymer of ethylene having a molecular weight of about 24,000 was placed on a clean plate and the assembly heated to about 100° C. Another warm glass plate was then placed on the first plate and pressure was applied so that the ethylene polymer formed an adherent interlayer of uniform thickness, and the sandwich allowed to cool to room temperature. The section of laminated glass thus formed was transparent. When the laminated article was struck a sharp blow, a number of radial cracks were formed but the section remained in one piece and still had considerable strength.

*Example III*

A tetrachloroethylene solution of an ethylene polymer having a molecular weight of about 30,000 was poured onto an amalgamated tin plate and the solvent removed by evaporation on a steam heated plate. After most of the solvent had been removed, the plate was cooled and the sheeting stripped. A film was obtained of about 0.03 inch in thickness. Pieces of this sheet were then placed on thin tin plate sheeting and heated in an oven until the material melted and all traces of solvent were removed. The sheets were then quenched rapidly in cold water. The films were then cold rolled to about 0.020 inch in thickness.

Pieces of five-inch by five-inch plate glass were sprayed with adhesive "A" described in Example I and allowed to dry 15 minutes at room temperature. The coated glass was then sprayed with a toluene solution of an isobutylene polymer having a molecular weight of about 10,000, and the treated glass allowed to dry for 4 hours at 45° C. At the end of this time the sheet of the ethylene polymer prepared as described above was assembled between the treated glass sheets and the composite heated at 80° C. under a pressure of 50 lbs. per sq. in. The resulting laminated glass was shatterproof at 50° C., room temperature, and at −18° C.

*Example IV*

A double window was constructed of two pieces of glass with a sealed air space between them. Glass strips were used for spacings on the four edges but all glass-to-glass contacts were eliminated by placing strips of an ethylene polymer (molecular weight about 30,000) film of 0.02 inch thickness on each side of the spacer strips, heating to 90° C., pressing together, and then sealing the edges with molten ethylene polymer.

*Example V*

Two panes of window glass 2″ x 5″ x ⅛″ were heated in an oven at 120° C. Strips of an ethylene polymer (molecular weight about 25,000) 0.20 inch by 0.03 inch thick were applied around the edge of one of the panes and allowed to melt so as to form a continuous border of ethylene polymer around the glass. The other glass pane was then superimposed on the first, the assembly gently pressed, and then allowed to cool to room temperature. A clear composite glass consisting of two glass panes, 0.025 inch apart and separated by an air-tight, continuous film of ethylene polymer was obtained.

Example VI

To a hot glass pane 2" x 5" x ⅛" was applied a border of ethylene polymer having a molecular weight of about 25,000 by laying around the edge of the glass a border of the aforementioned ethylene polymer in the form of strips 0.20 inch wide and 0.03 inch thick. The pane was allowed to cool to room temperature, the ethylene polymer edge treated with a 10% toluene solution of an isobutylene polymer having a molecular weight of about 14,000, and the solvent allowed to evaporate at room temperature. A composite glass was prepared by placing over the treated glass another glass and applying pressure in order to cause the ethylene polymer-polyisobutylene film to form an adherent layer between the two glass sheets. The double pane thus obtained was transparent and air-tight.

The foregoing examples are not to be considered as limitative but as illustrative of the products of this invention and methods for their preparation.

Gelatin or plasticized casein may be used in place of adhesive "A" used in Examples I and III.

The film or interlayer used in the preparation of the laminated glass articles of this invention need not necessarily consist only of ethylene polymer. It is frequently desirable to use a softening or plasticizing agent in conjunction with the ethylene polymer. As an example of a suitable plasticizing agent for this purpose may be mentioned paraffin wax.

This invention provides a simple method for the preparation of laminated glass articles of great utility. Since the ethylene polymer films have satisfactory bonding qualities, laminated glasses prepared therewith are characterized by strength and durability. The good strength of the ethylene polymer interlayers, coupled with their low density makes it possible to use thinner and lighter interlayers than is possible in the case of plastic materials previously described for this purpose. This is not only an economic advantage but also an advantage in utility since it makes it possible to prepare laminated articles of less weight. The products of this invention because of their good strength and non-shattering properties are useful in safety glass in motor vehicles, airplanes, etc. The invention is also useful in making burglar-proof glass. Another important application of this invention is in the preparation of double window glass.

As many apparently widely different embodiments of this invention may be made without departing from the spirit and scope thereof, it is to be understood that we do not limit ourselves to the specific embodiments thereof except as defined in the appended claims.

We claim:
1. A laminated article comprising two sheets of glass having therebetween a film of a solid polymer of ethylene which melts at temperatures above 100° C.
2. A laminated article comprising two sheets of glass having therebetween a film of a solid polymer of ethylene which melts at temperatures above 100° C., and which has a molecular weight of at least 6,000.
3. A laminated article comprising two sheets of glass having therebetween a film of a solid polymer of ethylene capable of being drawn into fibers which upon X-ray examination show orientation along the fiber axis.
4. A laminated article comprising two sheets of glass having therebetween a film of a solid polymer of ethylene which is solid at normal temperature, which corresponds in composition to $(CH_2)_x$ and which by X-ray diffraction analysis shows a crystalline structure.

ERIC WILLIAM FAWCETT.
REGINALD OSWALD GIBSON.
MICHAEL WILLCOX PERRIN.